United States Patent [19]
Nakamura

[11] Patent Number: 5,261,679
[45] Date of Patent: Nov. 16, 1993

[54] KEYLESS TYPE TOOL CHUCK

[75] Inventor: Daijiro Nakamura, Hyogo, Japan

[73] Assignee: Jacobs Japan, Inc., Aichi, Japan

[21] Appl. No.: 942,658

[22] Filed: Sep. 9, 1992

[30] Foreign Application Priority Data

Dec. 9, 1991 [JP] Japan .................. 3-262745

[51] Int. Cl.$^5$ .................................. B23B 31/12
[52] U.S. Cl. ........................ 279/62; 279/140; 279/902
[58] Field of Search ................ 279/60-65, 279/140, 902

[56] References Cited

U.S. PATENT DOCUMENTS

| | | | |
|---|---|---|---|
| 1,503,809 | 8/1924 | Schulz et al. | 279/61 X |
| 5,044,643 | 9/1991 | Nakamura | 279/60 |
| 5,172,923 | 12/1992 | Nakamura | 279/62 |

FOREIGN PATENT DOCUMENTS 63-189509 6/1988 Japan .

*Primary Examiner*—Steven C. Bishop
*Attorney, Agent, or Firm*—Darby & Darby

[57] ABSTRACT

In construction of a keyless tool chuck in which clamping torque is transmitted from a manually rotatable operation sleeve on a chuck body to tool clamping jaws in the chuck body via a power transmission unit including a cycloidal gear arrangement, an elastic impulsion sleeve is inserted between the operation sleeve and the chuck body so that elastic compressive deformation of the impulsion sleeve at forced rotation of the operation sleeve causes impulsive meshing engagement in the cycloidal gear arrangement to provide impulsive clamping force on a tool clamped by the jaws. Resultant clamping force is at least twice as large as that provided by a conventional cycloidal gear arrangement only.

6 Claims, 5 Drawing Sheets

KEYLESS TYPE TOOL CHUCK

BACKGROUND OF THE INVENTION

The present invention relates to a keyless tool chuck, and more particularly relates to an improvement in construction of a chuck for firmly holding a tool such as a drill bit or a driver bit of electric work devices without assistance by a chuck key.

One typical example of such a keyless tool chuck is proposed in Japanese Utility Model Laid-open Sho. 63-189509. The tool chuck of this earlier application includes a chuck body which slidably holds a plurality of clamping jaws in its front center section in a coaxial and oblique arrangement. The jaws are placed in outward screw engagement in their proximal sections with a screw ring inserted over the chuck body and this screw ring is outwardly in screw engagement with an operation sleeve idly inserted over the chuck body for manual operation.

As the operation sleeve is manually rotated, the screw ring is driven into rotation for convergent, collective sliding of the jaws via screw feeding and the collected jaws clamp a tool in position.

With the above-described construction, manual rotation of the operation sleeve is amplified by the screw feeding operation of the screw ring and converted into the convergent, collective sliding of the clamping jaws. This mechanism, however, cannot provide the tool chuck with a high degree of clamping force which is equivalent to that exhibited by a key type tool chuck. Its insufficient clamping force tends to allow easy development of play, or to say the least loosening, between the jaws and the tool, thereby making the tool chuck quite unsuited for use under high torque conditions. Further, in use, seizure tends to occur at contact spots between the chuck body and the operation sleeve, thereby seriously hindering smooth manual rotation of the operation ring.

SUMMARY OF THE INVENTION

It is the basic object of the present invention to provide a tool chuck which can exhibit a significantly high degree of clamping force.

It is another object of the present invention to provide a heavy duty tool chuck free of problems caused by play, loosening and/or seizure between cooperating elements.

In accordance with the basic aspect of the present invention, jaws for clamping a tool are mechanically connected to an operation sleeve adapted for manual rotation by means of a power transmission unit including a cycloidal gear arrangement and an elastic impulsion sleeve is interposed between a chuck body and the operation sleeve to provide impulsive clamping force on the tool via impulsive meshing engagement by forced rotation of the operation sleeve.

DESCRIPTION OF THE PREFERRED EMBODIMENTS

Figure 1:
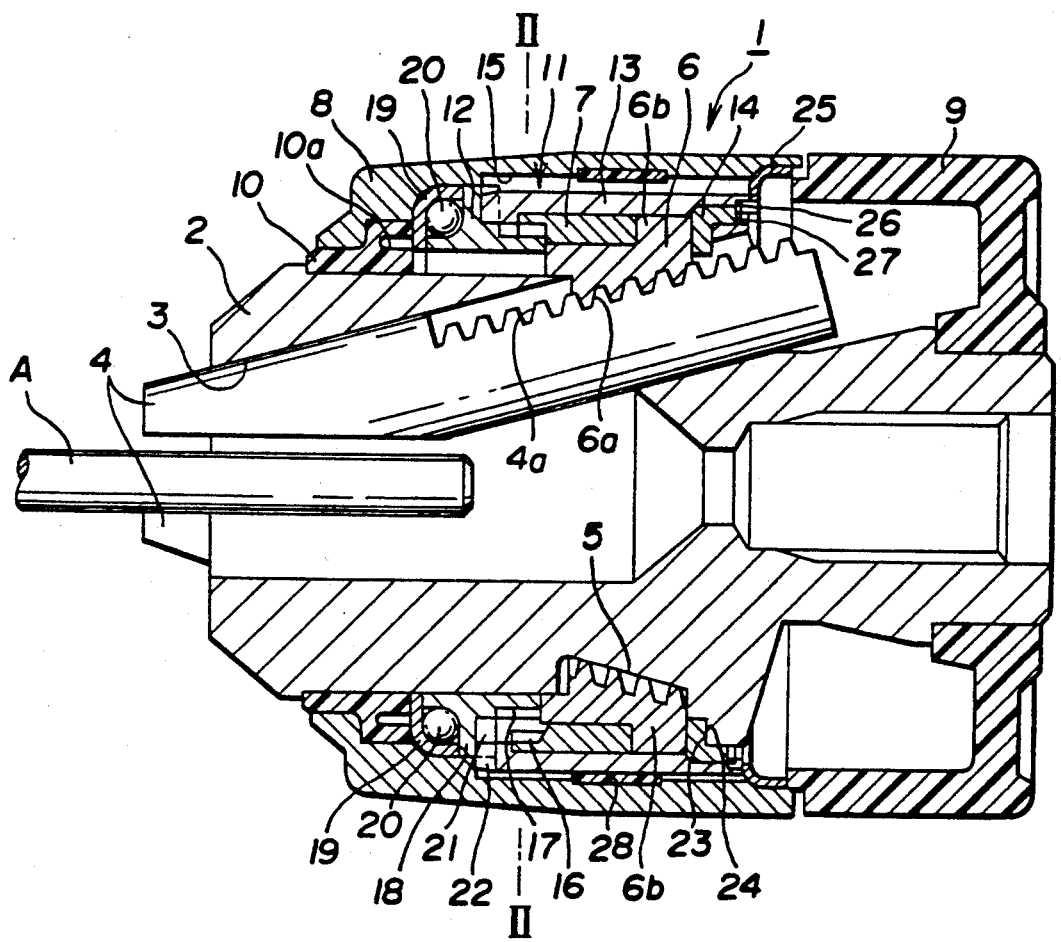
FIG. 1 is a side view, partly in section, of one embodiment of the tool chuck in accordance with the present invention in a position before clamping a tool.
Figure 2:
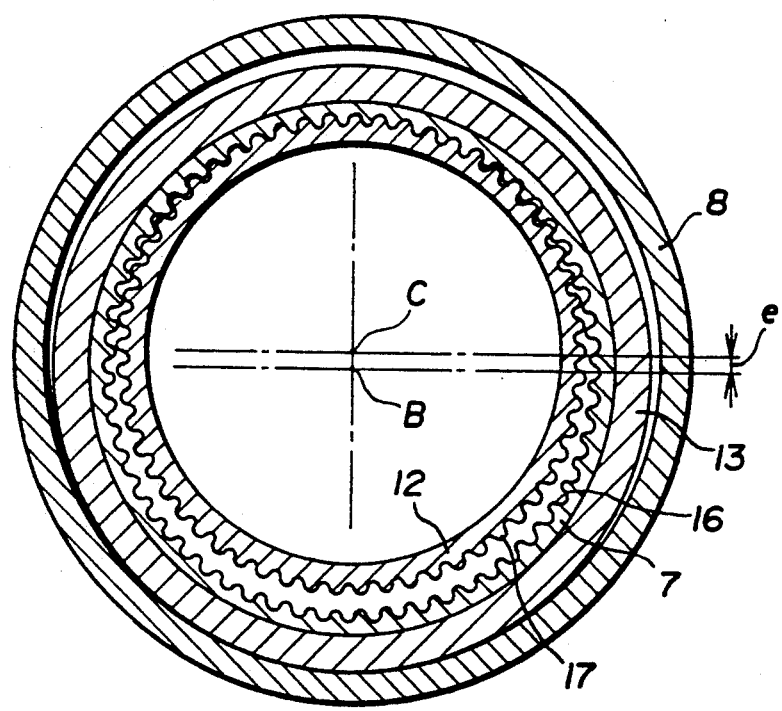
FIG. 2 is a section taken along a line II—II in FIG. 1.

One embodiment of the tool chuck in accordance with the present invention is shown in FIGS. 1 and 2 in a position before clamping a tool. As stated above, a tool chuck 1 includes, as major elements, a chuck body 2 of tubular construction, a plurality of clamping jaws 4 slidably accommodated in the chuck body 2, an operation sleeve 8 idly inserted over the chuck body 2, an input ring 12 idly and eccentrically inserted into the operation sleeve 8, a fixer ring 13 inserted into the operation sleeve 8, an output ring 7 inserted, in one body, into the fixer ring 13 in selective meshing engagement with the input ring 12, and a screw ring 6 inserted, in one body, into the output ring 7 in meshing engagement with the clamping jaws 4.

More specifically as shown in FIG. 1, the chuck is provided in its intermediate section with an annular cutout 5. The chuck body 2 is further provided in the front section with a plurality of guide holes 3 for sliding movement of the clamping jaws 4. In the case of the illustrated embodiment, three sets of guide holes 3 are coaxially arranged around the center axis B of the chuck body 2 at equal angular intervals. The guide holes 3 are arranged collectively and convergently forwards.

The clamping jaws 4 are slidably accommodated in the respective guide holes 3 in the chuck body 2 and each is provided in the proximal section with outer gear teeth 4.

The screw ring 6 is idly arranged in the annular cutout 5 formed in the intermediate section of the chuck body 2. This screw ring 6 is of a split construction made up of a pair of ring halves 6b. These ring halves 6b are forcibly inserted into the output ring 7. The screw ring 6 is provided with inner gear teeth 6a which are kept in meshing engagement with the outer gear teeth 4a of the clamping jaws 4. Following the principle of screw feeding, rotation of the screw ring 6 causes forward or rearward sliding movement of the clamping jaws 4 along the guide holes 3 in the chuck body 2.

The operation sleeve 8 is idly inserted over the front section of the chuck body 2 and its rear section spacedly surrounds the fixer ring 6. A holder ring 9 is fixedly inserted over the rear section of the chuck body 2 so that the rear end of the operation sleeve 8 idly embraces the front end of the holder ring 9. An annular outer step is formed on the front end of the chuck body 2 and an annular inner step is formed on the front end of the operation sleeve 8 so that an impulsion ring 10 is fixedly interposed between the two steps. This impulsion sleeve 10 is made of an elastic material such as synthetic resin and functions to reduce frictional resistance between the chuck body 2 and the operation sleeve 8, thereby effectively preventing seizure between these cooperating elements. For stable placement between the steps, the impulsion sleeve 10 is provided with an annular slot 10a which enables radial, expansive, elastic deformation of the entire sleeve configuration. As later described in more detail, this elastic deformation of the impulsion sleeve 10 is utilized for adjustment of the intensity of cycloidal meshing engagement between the input and output rings 12, 7. Further, the impulsion sleeve 10 also operates as a stopper for the input ring 12.

A power transmission unit 11 is interposed between the screw ring 6 and the operation sleeve 8. The power transmission unit 11 includes the screw ring 6, the output ring 7, the input ring 12, the fixer ring 13 and an additional fixer ring 14 which is kept in fixed pressure contact with the outer periphery of the intermediate section of the chuck body 2.

As shown in FIG. 2, the center axis C of the operation sleeve 8 is deviated from the center axis B of the chuck body 2 by a distance "e". The input ring 12 is idly inserted within the inner periphery 15 of the operation sleeve 8 so that rotation of the operation sleeve 8 about the center axis C should cause corresponding revolution of the input ring 12 about the same center axis C.

The input ring 12 is provided on its intermediate section with an outer flange 18 and a washer type holder ring 19 is idly inserted over the front section of the chuck body 2 at a position between the rear end of the impulsion sleeve 10 and the front end of the input ring 12 so that a plurality of thrust balls 20 are held between the outer flange 18 on the input ring 12 and the holder ring 19 for free rolling. A plurality of recesses 21 are formed in the rear face of the outer flange 18 on the input ring 12 and corresponding number of pins 22 are arranged on the front end of the fixer ring 13 in engagement with the respective recesses 21 in the outer flange 18. The size of each pin 22 is chosen to allow revolution of the input ring 12. Stated otherwise, this pin-recess engagement allows revolution of the input ring 12 about the center axis B but prohibits rotation of the latter about the center axis C. Further, the input ring 12 is externally provided on its rear section with cycloidal gear teeth 17 as best seen in FIG. 2.

The output ring 7 is inserted, in one embodiment, into the fixer ring 13 and internally provided on its front section with cycloidal gear teeth 16 which come into selective meshing engagement with the cycloidal gear teeth 17 on the input ring 12. In this cycloidal gear arrangement, the tip of each gear tooth is rounded for smooth sliding at inter-teeth engagement. It should be noted that the gear teeth 16 are different in their number of teeth from that of the gear teeth 17. When the operation sleeve 8 is manually rotated, the eccentric arrangement of its inner periphery 15 drives the input ring 12 for revolution about the center axis B. Then, the above-described difference in the number of teeth in the cycloidal gear arrangement causes corresponding rotation of the input ring 12 about the center axis C over a rotation angle commensurate with the difference in the number of teeth. Thus, the rotation of the input ring 12 is greatly decelerated from the rotation of the operation sleeve 8. Stated otherwise, output torque of the input ring 12 is much amplified from the input torque of the operation sleeve 8.

Assuming that the output ring 7 has 68 cycloidal teeth and the input ring 12 has 65 teeth, the differences in tooth number is equal to 3. Then, the deceleration ratio is equal to 3 teeth/65 teeth = 1/21.6. This deceleration ratio leads to a high degree of torque amplification and a large torque is taken out of the output ring 7.

As stated above, the intensity of meshing engagement between the cycloidal gear teeth 16 and 17 is adjusted by the design of the impulsion sleeve 10. More specifically, the material for the impulsion sleeve 10 as well as the shape and depth of its annular slot 10a are factors to influence the intensity of meshing engagement.

The second fixer ring 14 arranged behind the first fixer ring 13 has an inner flange at its front end and the rear face of this inner flange forms an annular abutment 23 extending normal to the center axis B of the chuck body 2. A like annular abutment 24 is formed on the chuck body 2. At clamping of a tool A, reaction from the clamping jaws 4 forces the screw ring 6 to move rearwards and, as a consequence, brings the two abutments 23 and 24 into pressure contact with each other via the second fixer ring 14. That is, the fixer ring 14 is locked to the chuck body 2 so that its free rotation should be prohibited.

An elastic ring 25 is force inserted into the rear end of the operation sleeve 8. This elastic ring 25 is provided on its inner periphery with a number of elastic tongues 26 which are in engagement with corresponding number of depressions 27 formed in the rear end of the second fixer ring 14. When the operation sleeve 8 is rotated, this tongue-depression engagement operates to cancel the pressure contact between the second fixer ring 14 and the chuck body 2 at the abutments 23 and 24. A thin ring 28 is secured to the inner periphery of the operation sleeve. The ring 28 is made of a synthetic resin of low friction coefficient and used for lubrication between the operation ring 8 and the first fixer ring 13. For example, the ring 28 is made of a synthetic resin product sold under a commercial name "Teflon".

With the above-described construction, the tool chuck 1 in accordance with the present invention operates as follows.

Just before commencement of the clamping operation, the entire system assumes the position shown in FIGS. 1 and 2. In this position, the holder ring 9 is held unmovable and the operation sleeve 8 is manually rotated in the clamping direction.

During the starting period of rotation of the operation sleeve 8, the clamping jaws 4 are still out of contact with the tool A and no reaction is transmitted from the clamping jaws 4 to the power transmission unit 11. Under this condition, the second fixer ring 14 is rotatable about the chuck body 2. Due to the tongue-depression engagement between the second fixer ring 14 and the elastic ring 25, rotation of the second fixer ring 14 induces concurrent rotation of the operation sleeve 8, the input ring 12 and the first fixer ring 13 as one body. Thus, the screw ring 6 is driven for rotation at a rotation speed equal to that of the operation sleeve 8. Based on the principle of screw feeding, the clamping jaws 4 move collectively forwards toward the tool A at a high speed.

Figure 3:
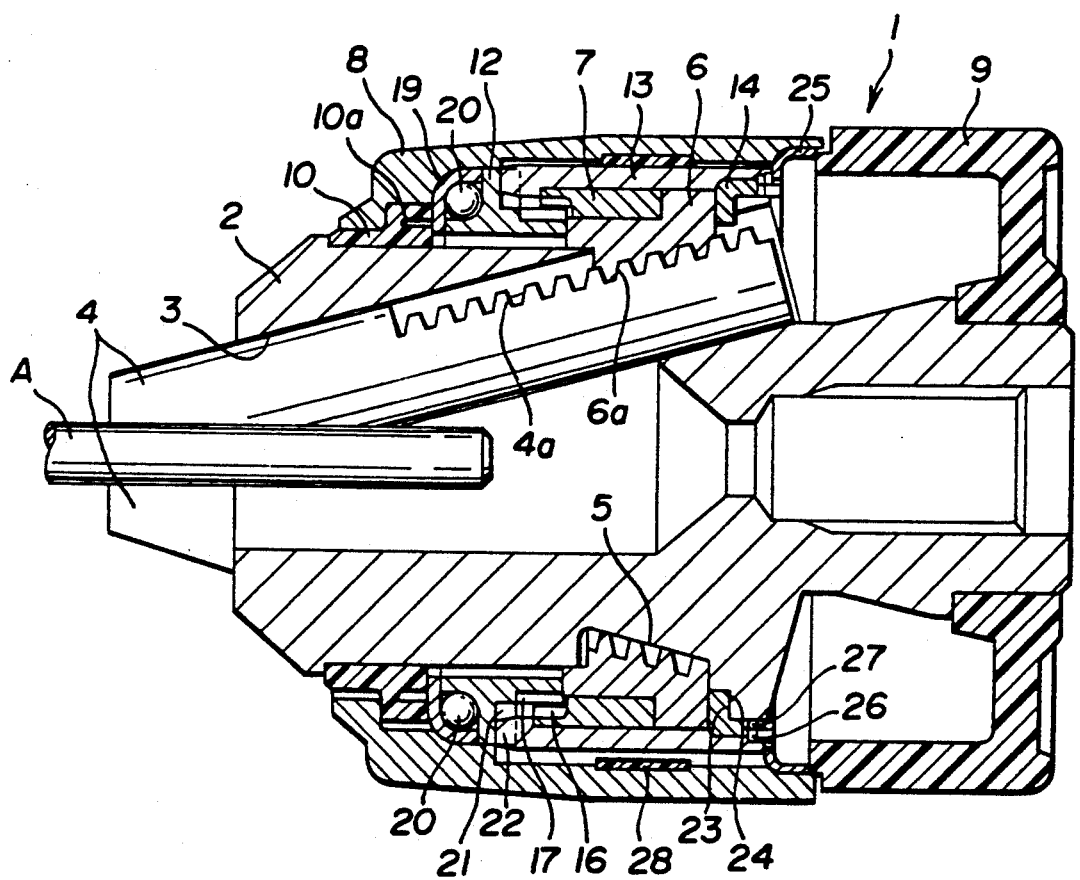
FIG. 3 is a side view, partly in section, of the tool chuck shown in FIGS. 1 and 2 in a position just after clamping a tool.

As a result of this collective forward movement, the clamping jaws 4 now clamp the tool A as shown in FIG. 3 and reaction from the tool A acts on the screw ring 6 which is then forced to move rearwards. This rearward movement of the screw ring 6 brings the abutment 23 of the second fixer ring 14 into pressure contact with the abutment 2 on the chuck body 2 in order to provisionally fix the second fixer ring 14 in one body to the chuck body 2 and initiate deceleration by the power transmission unit 11.

Under this condition, rotation of the operation sleeve 8 causes revolution of the input ring 12 about the center axis B of the chuck body 2 due to the eccentric arrangement of its inner periphery 15 (see FIG. 2). Then, as stated already, the difference in number of teeth in the cycloidal gear arrangement (gear teeth 16 and 17) drives the input ring 12 for rotation about the center axis B of the chuck body 2. This rotation of the input ring 12 is highly decelerated from the rotation of the operation sleeve 8 and, as a consequence, the output torque from the input ring 12 is much amplified from the input torque applied to the operation sleeve 8. The screw ring 6 is driven for rotation by this high torque via the output ring 7 so as to make the jaws 4 clamp the tool with a high degree of clamping force.

Figure 4:
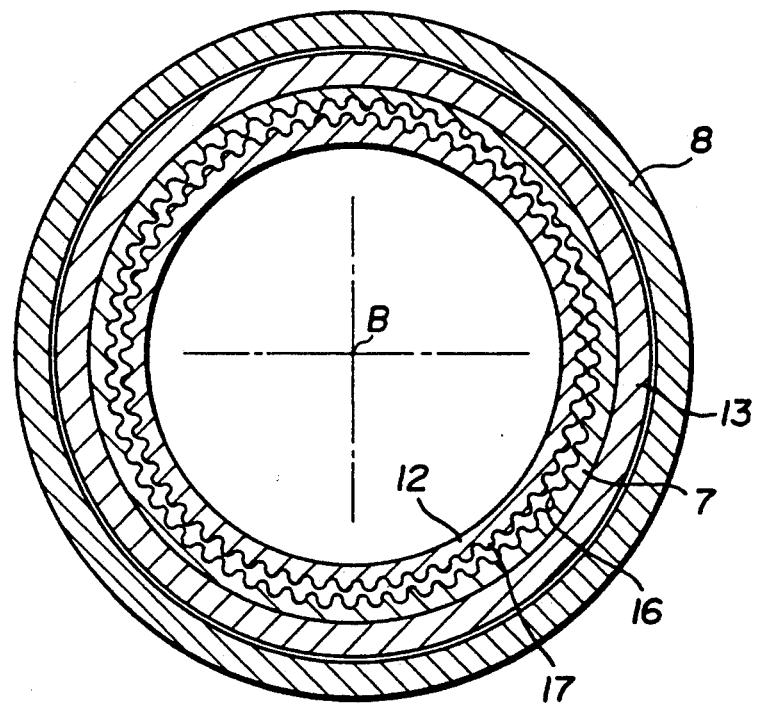
FIG. 4 is a section taken along a line IV—IV in FIG. 3.
Figure 5:
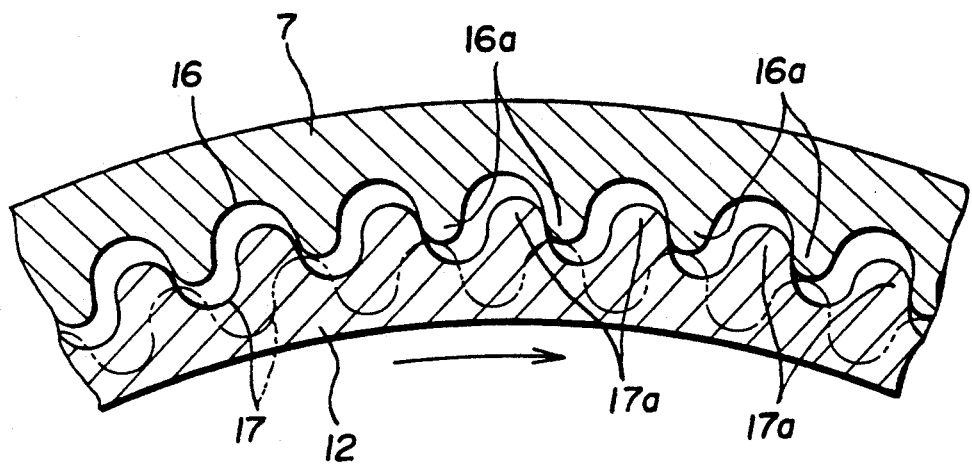
FIG. 5 is an enlarged fragmentary view of the cycloidal gear meshing between the input and output rings used for the tool chuck shown in FIGS. 1 and 2.

During the above-described clamping procedure, reaction from the tool A operates to cancel the engagement at the cycloidal gear arrangement. That is, the cycloidal gear teeth 16 on the output ring 7 and the cycloidal gear teeth 17 on the input ring 12 tend to be disengaged from each other. When the input torque at the operation sleeve 8 exceeds a certain limit, pressure contact at tips 16a, 17a between the gear teeth 16 and 17 forces the input ring 12 to move towards the center axis B of the chuck body 2 against elastic behavior of the impulsion sleeve as shown in FIG. 5. Concurrently with this process, the impulsion sleeve 10 is compressed in the radial direction to store elastic energy and, as shown in FIG. 4, the cycloidal gear teeth 16 and 17 are provisionally placed out of their meshing engagement. When the tips 16a and 17a of the gear teeth 16 and 17 slip over one tooth distance as shown with a chain line in FIG. 5, the energy stored at the impulsion sleeve 10 is released to return the input ring 12 to the initial position shown in FIG. 2. As a result, the gear teeth 16 and 17 are brought back into impulsive meshing engagement. As shown with solid lines in FIGS. 5, meshing engagement between the gear teeth 16 and 17 shifts tooth by tooth through impulsive contacts of their tips 16a and 17a.

This impulsive meshing engagement in the cycloidal gear arrangement rotates the screw ring 6 slightly in the clamping direction and produces a clamping force which is at least twice as large as the clamping force resulting only from the difference in teeth number.

The above-described impulsive meshing engagement in the cycloidal gear arrangement shifts in a circumferential direction of the chuck body 2 and an impulsive force produced thereby assures uniform clamping of the tool A by the plurality of jaws 4. Additionally, since the impulsion sleeve 10 is made of an elastic synthetic resin, its presence well alleviates friction between the operation sleeve 8 and the chuck body 2, thereby effectively preventing seizure between the cooperating elements.

Compressive deformation of the impulsion sleeve 10 causes local pressure contact between the operation sleeve 8 and the fixer ring 13 but presence of the lubricator ring 28 alleviates friction generated during eccentric rotation of the operation sleeve 8 and the first fixer ring 13. Further, the operation sleeve 8 relies on a two-point support, one by the impulsion sleeve 10 and the other by the lubricator ring 28. These constructions cooperate to prevent unstable and unsmooth rotation of the operation sleeve 8 when driven manually.

In order to free the tool A from hold by the jaws 4, the operation ring 8 is manually rotated in the unclamping direction. As long as the pressure contact between the abutments 23 and 24 is maintained, the power transmission unit 11 is under a high torque condition and, as a consequence, rotation of the operation sleeve 10 acts at high torque on the screw ring 6 which in turn rotates in the unclamping direction to cancel the clamp on the tool A by the clamping jaws 4 without fail. Thus, reaction from the tool A via the jaws 4 disappears and the elastic ring 25 now urges the second fixer ring 14 to move forwards. This forward movement of the second fixer ring 14 releases the abutments 23 and 24 from the pressure contact. As a result, the input ring 12 and the fixer rings 13 and 14 rotate with the operation sleeve 8 and, since deceleration by the power transmission unit 11 has already been dismissed, the screw ring 6 now rotates at a rotation speed which is the same as that of the operation sleeve 8. This rotation of the screw ring 6 accompanies corresponding swift rearward movement of the clamping jaws 4 away from the liberated tool A.

As stated above, momentary slip shifting takes place between the gear teeth 16 and 17 of the cycloidal gear arrangement when the input torque via the operation sleeve 8 exceeds a certain level. At this slip shifting, the impulsive meshing engagement in the cycloidal gear arrangement causes corresponding additional rotation of the screw ring 6 in the clamping direction, thereby providing a momentary clamping force which is at least twice as large as the clamping force resulting from the difference in the number of teeth between the gear teeth 16 and 17. The significantly increased clamp force assures a reliable hold on the tool A.

Additionally, since the above-described impulsive meshing engagement shifts in the circumferential direction of the chuck body 2, the impulsive force enables uniform clamping on the tool A by the plurality of clamping jaws 4. Further, presence of the impulsion sleeve 10 made of an elastic synthetic resin smooths the sliding contact between the operation sleeve 8 and the chuck body 2, thereby effectively preventing seizure between the two cooperating elements.

Presence of the lubricator ring 28 on the inner periphery 15 of the operation sleeve 8 alleviates friction between the first fixer ring 13 and the operation sleeve 8 during the eccentric revolution. Unstable rotation of the operation sleeve 8 is also prevented by the two-point support, one by the lubricator ring 28 and the other by the impulsion sleeve 10.

In addition, as the impulsion sleeve 10 is fitted to the inner annular step of the chuck body 2, the same functions as a stopper for the power transmission unit 11 too.

I claim:

1. A keyless tool chuck comprising
    a tubular chuck body provided with a center bore for accommodating a tool and a plurality of coaxially arranged guide holes which collectively converge forwards into said center bore in a front section of said chuck body,
    a plurality of clamping jaws slidably accommodated in said guide holes in said chuck body and each provided on a proximal section with outer gear teeth,
    an operation sleeve inserted over said front section of said chuck body for manual rotation,
    a power transmission unit interposed between said clamping jaws and said operation sleeve, said unit including a cycloidal gear arrangement in meshing engagement with said outer gear teeth of said clamping jaws, and
    an impulsion sleeve interposed between said front section of said chuck body and said operation sleeve and made of an elastic material.

2. A keyless tool chuck as in claim 1 wherein said impulsion sleeve is made of elastic synthetic resin.

3. A keyless tool chuck as claimed in claim 1 further comprising
    a lubricator ring attached to an inner periphery of said operation sleeve.

4. A keyless tool chuck as in claim 1 wherein said power transmission unit includes an input ring inserted into said operation sleeve in an eccentric arrangement and provided with outer gear teeth forming said cycloidal gear arrangement, an output ring provided with inner gear teeth placed in selective meshing engagement with said outer gear teeth of said input ring, and a screw ring mechanically connected to said output ring and kept in meshing engagement with said outer gear teeth of said clamping jaws.

5. A keyless tool chuck as in claim 2 further comprising a lubricator ring of a low friction coefficient attached to an inner periphery of said operation sleeve.

6. A keyless tool chuck as in claim 3 wherein said power transmission unit includes an input ring inserted into said operation sleeve in an eccentric arrangement and provided with outer gear teeth forming said cycloidal gear arrangement, an output ring provided with inner gear teeth placed in selective meshing engagement with said outer gear teeth of said input ring, and a screw ring mechanically connected to said output ring and kept in meshing engagement with said outer gear teeth of said clamping jaws.

* * * * *